(12) United States Patent
Parees et al.

(10) Patent No.: US 7,882,142 B2
(45) Date of Patent: Feb. 1, 2011

(54) DYNAMIC OPTIMIZED DATASTORE GENERATION AND MODIFICATION FOR PROCESS MODELS

(75) Inventors: Benjamin M. Parees, Durham, NC (US); James Thorpe, Cary, NC (US); Prasad R. Vishnubhotla, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 11/422,105

(22) Filed: Jun. 5, 2006

(65) Prior Publication Data

US 2007/0282864 A1 Dec. 6, 2007

(51) Int. Cl.
G06F 7/00 (2006.01)
G06F 17/30 (2006.01)
(52) U.S. Cl. ................. 707/802; 707/803; 707/807
(58) Field of Classification Search .............. None
See application file for complete search history.

(56) References Cited

U.S. PATENT DOCUMENTS

| | | | |
|---|---|---|---|
| 5,918,232 A | 6/1999 | Pouschine et al. | |
| 6,061,515 A | 5/2000 | Chang et al. | |
| 6,341,279 B1 * | 1/2002 | Nye | 707/3 |
| 6,477,536 B1 | 11/2002 | Pasumansky et al. | |
| 6,578,043 B2 * | 6/2003 | Nye | 707/102 |
| 2003/0004959 A1 | 1/2003 | Kotsis et al. | |
| 2003/0009455 A1 * | 1/2003 | Carlson et al. | 707/6 |
| 2003/0046282 A1 * | 3/2003 | Carlson et al. | 707/6 |
| 2003/0163479 A1 * | 8/2003 | Mathews et al. | 707/102 |
| 2003/0204517 A1 | 10/2003 | Skinner et al. | |
| 2004/0181502 A1 | 9/2004 | Yeh et al. | |
| 2005/0010550 A1 | 1/2005 | Potter et al. | |
| 2005/0049882 A1 * | 3/2005 | Sawka | 705/1 |
| 2005/0096966 A1 * | 5/2005 | Adi et al. | 705/10 |
| 2005/0289457 A1 * | 12/2005 | Obasanjo et al. | 715/513 |
| 2006/0112109 A1 * | 5/2006 | Chowdhary et al. | 707/100 |

OTHER PUBLICATIONS

Liangzhao Zeng, Hui Lei, Michael Dikun, Henry Chang, Kumar Bhaskaran, "Model-Driven Business Performance Management," icebe, pp. 295-304, IEEE International Conference on e-Business Engineering (ICEBE'05), Oct. 18-21, 2005, Beijing, China.*
Holistic Source-centric Schema Mappings for XML-on-RDBMS, A Thesis Submitted for the Degree of Master of Science (Engineering) in the Faculty of Engineering by Priti Patil, Supercomputer Education and Research Centre, Indian Institute of Science, Bangalore—560 012, India, Sep. 2005.*

* cited by examiner

Primary Examiner—Jay A Morrison
(74) Attorney, Agent, or Firm—R. Brian Drozd; Charles L. Moore; Moore & Van Allen, PLLC

(57) ABSTRACT

A method for generating and modifying a datastore may include identifying all processes associated with an observation model and identifying any metrics associated with each process to be recorded. The method may also include automatically constructing a database schema to store the metric data and provide appropriate interrelations between the processes.

18 Claims, 8 Drawing Sheets

DYNAMIC OPTIMIZED DATASTORE GENERATION AND MODIFICATION FOR PROCESS MODELS

BACKGROUND OF THE INVENTION

The present invention relates to storing and managing data related to processes, such as business processes and the like, and more particularly to dynamic optimized datastore generation and modification for process models.

Of importance in managing any process, such as a business process or the like, is the ability to efficiently store, sort, retrieve and present data related to the process. The data to be stored may be of an indeterminate structure and may be definable only by the process being monitored. Some processes may have a particular set of interesting attributes that should be stored or recorded, while others may have an entirely different set, unique to that particular process. For example, online ordering processes may need to record product prices and quantities while human resources processes may need to record marital status information, starting salaries and the like. For efficient operation, such data is desirably stored and retrievable in an extremely efficient and reliable manner for high throughput and high availability. Systems and methods for such operations are typically customized for the process and manually developed. They are typically not reusable on other processes because the data to be recorded may be completely different. Additionally, any changes to the process may require manual updating to support the new data to be stored.

BRIEF SUMMARY OF THE INVENTION

In accordance with an embodiment of the present invention, a method for generating and modifying a datastore may include identifying all processes associated with an observation model and identifying any metrics associated with each process to be recorded. The method may also include automatically constructing a database schema to store the metric data and provide appropriate interrelations between the processes.

In accordance with another embodiment of the present invention, a system for generating and modifying a datastore may include a schema generator to automatically construct a database schema to store metric data and provide appropriate interrelations between processes of an observation model. The schema generator may include a module to generate a table corresponding to each process in the observation model. The schema generator may also include another module to provide a column in each table to store each metric associated with a particular process corresponding to the table.

In accordance with another embodiment of the present invention, a computer program product to generate and modify a datastore may include a computer usable medium having computer usable program code embodied therein. The computer usable medium may include computer usable program code configured to generate a table for each process in an observation model. The computer usable medium may also include computer usable program code configured to provide a column in each table corresponding to each metric associated with the process that is intended to be recorded.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1A:
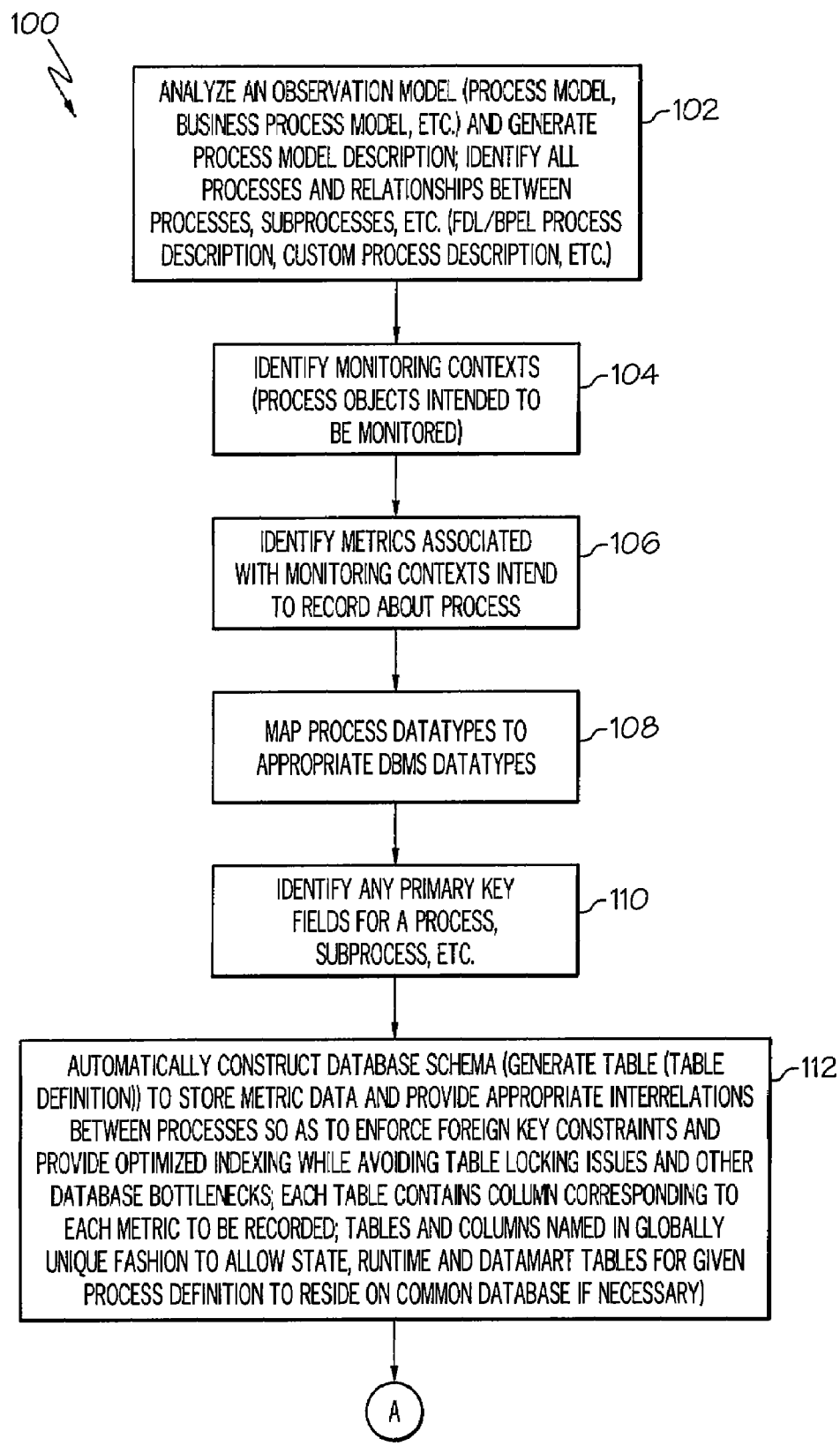
FIGS. 1A and 1B (collectively FIG. 1) are flow chart of an exemplary method for dynamically, optimally generating and modifying a datastore in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device, or medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalitalk, C++ or the like. However, the computer program code for carrying out operations of the present invention may also be written in conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1B:
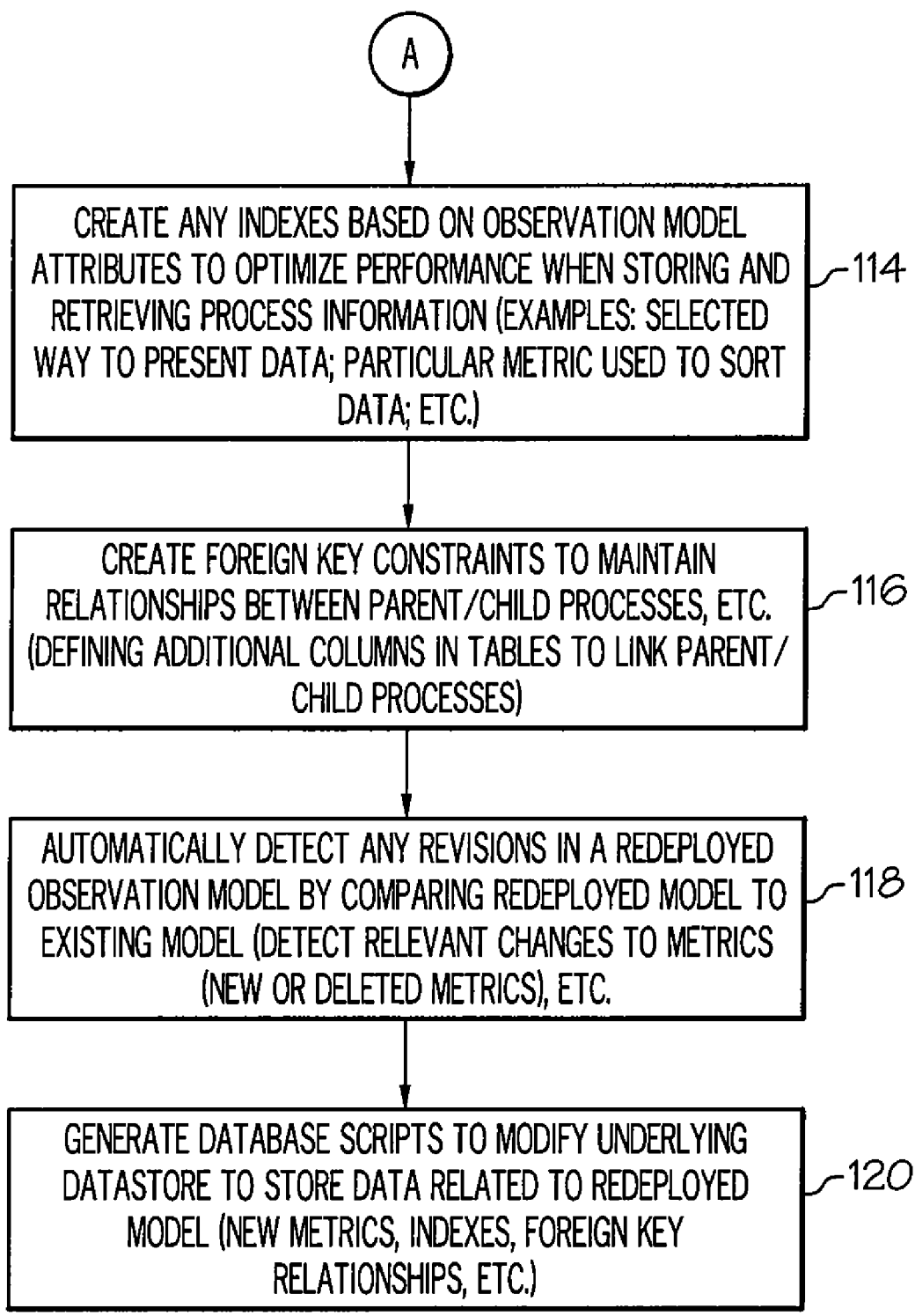

FIGS. 1A and 1B (collectively FIG. 1) are flow chart of an exemplary method 100 for dynamically, optimally generating and modifying a datastore in accordance with an embodiment of the present invention. In module or block 102, an observation model may be analyzed or formed by a modeling tool or the like as will be described in more detail with reference to system 400 in FIG. 4. The observation model may be a process model, business process model or any type of process that may be modeled as described herein. A process model description may be generated. All processes associated with the model may be identified and all relationships between processes, subprocesses or the like may be identified and defined. The process model description may be developed by or involve a Flow Definition Language or Business Process Execution Language (FDL/BPEL) process description, custom process description or other means of describing a process model digitally or electronically. The observation model may be metadata on top of the FDL/BPEL process description.

As an example of an observation model, a business process model may be a flow diagram indicating the steps that may be involved in a business process, such as the handling of an online store order. For example, first an order may be received followed by payment for the order being processed. Next the item ordered may be packaged for shipping, followed by shipping the package. Each step may be a subprocess within an overall online-ordering process. Each step or operation may have information associated with it, such as how long did it take to process payment, how much the item weighed when packaged, what is the tracking number provided when the item was shipped and similar information. The process model may have a specific structure that indicates the relationship between a process and its subprocesses or other processes. The model may be formed as an XMI file. XMI is an acronym for XML Metadata Interchange format which is an object-based model for exchanging program data across a network, such as the Internet, intranet or other type network. XML is extensible Markup Language used to define data elements on a Web page or in business-to-business documents.

In module or block 104, a monitoring context may be identified. Monitoring contexts may be process objects that are intended to be monitored during operation of the process. In block 106, all metrics associated with each monitoring context that is to be recorded about the process may be identified. A metric may be any piece of data about a process that a user may desire to record, such as time an order came in, time an order was shipped, quantities and identities of ordered items, cost of an order and other information. A monitoring context may correspond to a process or subprocess and consist of multiple metrics. The monitoring context may reference parent/subprocesses via a parent/child relationship. Accordingly, a parent may involve multiple subprocesses or child processes that may be related to the parent process in a unique or special way.

In module or block 108, process datatypes may be mapped to appropriate Database Management System (DBMS) datatypes. The mapping may be done based on a hardcoded mapping for the particular database system involved. For example, if a metric is identified as type "String" in the model that means the metric will contain textual data as opposed to numeric data, time, dates, etc. To store textual data in a DB2 relational database or similar database, the column datatype must be identified as a "Varchar" (variable length character data field). Similarly, if the model indicates that the datatype is "Numeric" then the method 100 may create a database column of type "Integer". Depending on the DBMS type (DB2, Oracle, SQL Server, etc.), the database column type can change because different DBMSs may have different names for the various datatypes. The method 100 of the present invention is adapted to handle this mapping from the model's datatype identifier, to the appropriate datatype in the DBMS based on the actual DBMS software (DB2 vs. Oracle, etc.). DB2 is a trademark of IBM Corporation in the United States, other countries or both. Oracle is a trademark of Oracle International Corporation in the United States, other countries or both. SQL Server is a trademark of Microsoft Corporation in the United States, other countries or both.

In block or module 110, any primary key fields may be identified for a process, subprocess or the like. A user may indicate in a model which metrics are part of a set of metrics forming a key. In block 110, the present invention may aggregate all metrics identified as part of the key and construct a primary key definition in the DBMS. A primary key may define a set of columns in a database table that uniquely identify a row in the table. That is, no matter how many rows are in the table, no two rows can have the same value for all of the primary key columns simultaneously.

In block 112, a database schema may be automatically constructed to store metric data and provide appropriate interrelations between processes so as to enforce foreign key constraints and provide optimized indexing while avoiding table locking issues and other database bottlenecks. Constructing the database schema may include creating at least one table for each monitoring context where the contents of the particular table are defined by the metrics inside the monitoring context. Each table may contain a column corresponding to each metric to be recorded.

The database schema may include State and Runtime databases and a Datamart database. A State Database may be a database optimized for data collection, insertion, updating as opposed to reading/reporting purposes. A Runtime Database may be a database optimized for non-dimensional reporting, which basically means viewing data associated with a specific process instance, but not a summary/aggregation of data about multiple processes. A Datamart Database may be a database optimized for dimensional reporting utilizing a star schema. In the State and Runtime databases, typically only one table may be created, which contains all the data about a process or subprocess. However, in the Datamart database a star-schema may be created. An example of creating a star-schema database is described in more detail U.S. patent application Ser. No. 11/459,714, entitled "Dynamic Creation of Star-Schema Database Structures and Cubes" which assignable to the same assignee as the present invention and incorporated herein in its entirety by reference.

In the Datamart database, the majority of the data may be stored in a fact table, but the fact table may also contain references to a number of dimension tables. For example, there may be ten entries or orders (process instances) for the sale of items stored in the Datamart database. Each order may be represented as a single row in the fact table, each with a different quantity associated. All ten orders might be for the same product type, so all ten rows would contain a pointer to a single row in a product dimension table. Therefore, the model contains some additional information on each metric to indicate whether it should be represented as a fact or a dimension in the resulting database schema.

Tables and columns may be named in a globally unique fashion to allow State, Runtime and Datamart tables for a given process definition to reside on a common database, if desired or necessary. Additionally, the tables and columns may be named in a globally unique fashion using information embedded in the observation model, ensuring that the schema created can be deployed to any existing database without concerns of name collisions.

In block or module 114, any indexes based on the observation model attributes may be created to optimize performance when performing operations that may include but are not necessarily limited to storing, sorting, collating, retrieving and presenting process information or data.

In block or module 116, foreign key constraints may be created to maintain relationships between related processes, such as parent and child processes, main processes and subprocesses or the like. A foreign key constraint may be created by defining an additional column in a table to link related process. Foreign key constraints may be pointers from one row in one table to another row in another table.

In block or module 118, any revisions in a redeployed observation model or the like may be automatically detected. The revisions may be detected by comparing the redeployed model to the existing or previous model to detect relevant changes to metrics, such as new, revised or deleted metrics, or other types of changes to the model. In block or module 120, a database script may be generated to modify an underlying datastore to store information or data related to the redeployed model, such as new metrics, indexes, foreign key relationships and the like. An example of a method to detect changes and update or modify the database schema accordingly is described in more detail with reference to FIG. 3.

Figure 2A:
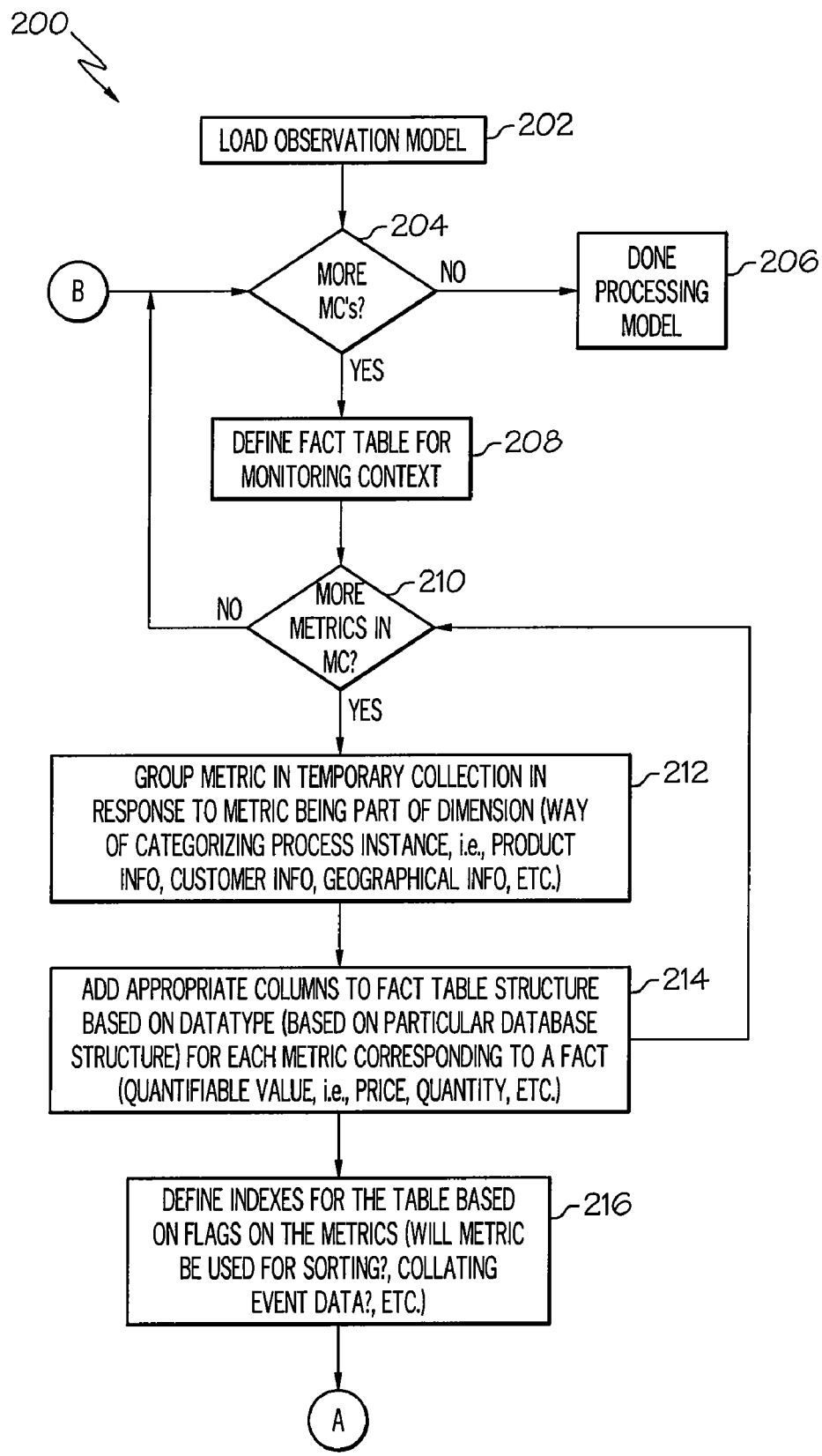
FIGS. 2A and 2B (collectively FIG. 2) are flow chart of an exemplary method for creating a datastore from an observation model in accordance with another embodiment of the present invention.
Figure 2B:
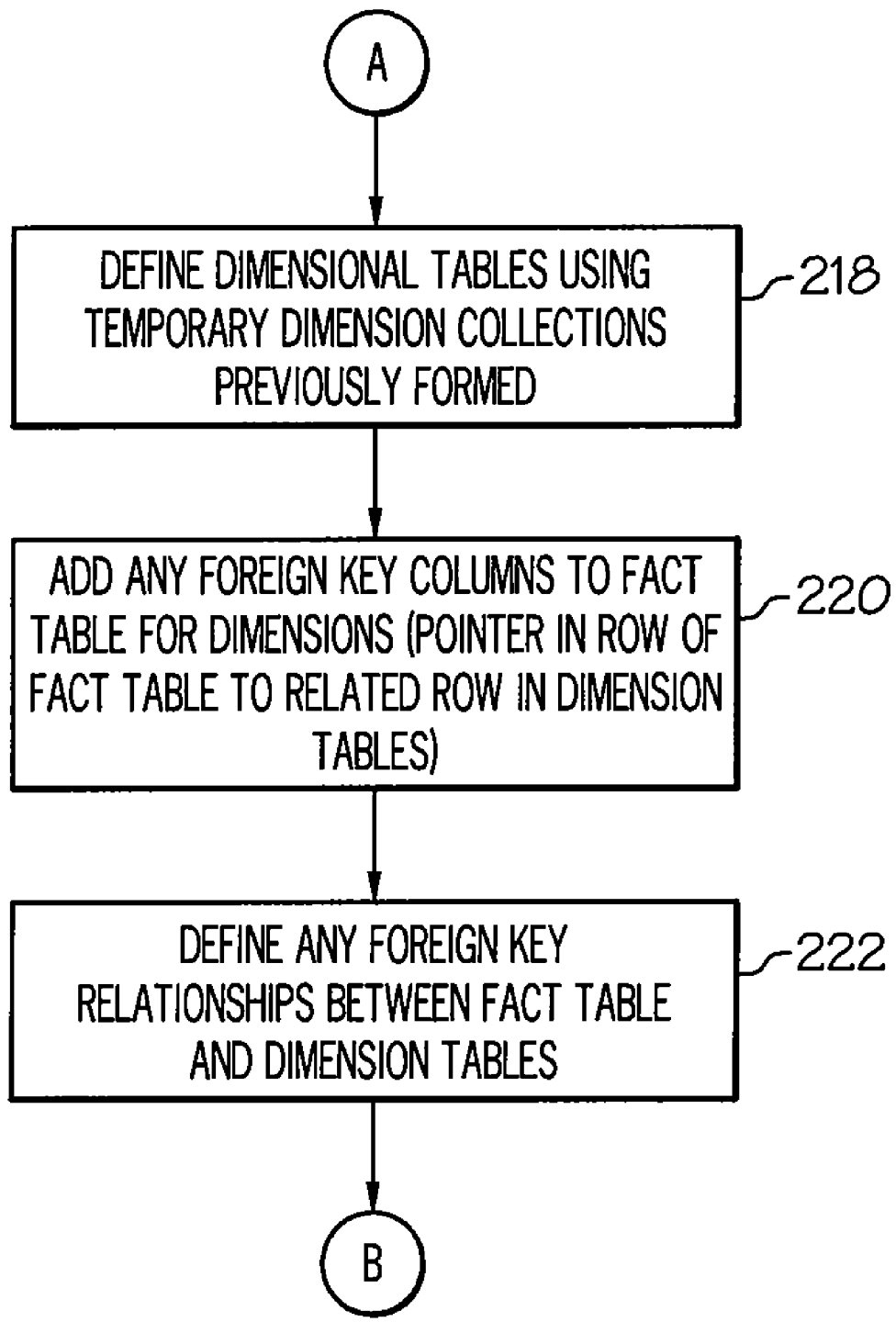

FIGS. 2A and 2B (collectively FIG. 2) are flow chart of an exemplary method 200 for creating a datastore from an observation model in accordance with another embodiment of the present invention. In block 202, an observation model may be loaded on a schema generator or the like. The schema generator may be an application server or may reside on an application server. The schema generator may include data structures, modules or components to create a database schema or datastore from an observation model as described herein. The schema generator may also be adapted to update the database schema or datastore in response to any changes in the observation model as described herein with reference to FIG. 3.

The schema generator or method 200 may then begin iterating through all monitoring contexts associated with the observation model. In block 204, a determination may be made whether there is any more monitor contexts (MCs) associated with the observation model. If there are no more MCs, the method may advance to block 206 and the method 200 is done processing the observation model. If there are more MCs, the method 200 may advance to block 208. In block or module 208, a fact table may be defined or formed for the current monitoring context. To define or form the fact table, the method 200 may iterate through all metrics associated with the particular monitor context. Accordingly, a determination may be made in block 210 if there are more metrics associated with the current monitoring context. If there are no more metrics, the method 200 may return to block 204 to determine if there are more monitoring contexts in the model. Otherwise, the method 200 may advance to block 212.

In block 212, the metric may be grouped in a temporary collection in response to the metric being part of a dimension or being classified as a dimensional metric. A dimension or dimension metric may be defined as a way of categorizing a process instance. Examples of a dimension metric may include but is not necessarily limited to product information, customer information, geographic information, month, day and year information, or other information of this nature.

In block 214, appropriate columns may be added to a fact table structure based on datatype for each metric corresponding to a fact. The datatype will be based or dependent upon the particular database structure or type, such as DB2, Oracle, SQL Server, similar to that previously described. A fact may correspond to a quantifiable value that can be summed, averaged, counted, etc. Examples may include price, quantity, or similar quantifiable items.

In block 216, indexes may be defined for the table based on flags on the metrics. For example, will the metric be used for sorting, collating event data, or for other purposes? The observation model may be annotated with additional information related to sorting, aggregation types or the like prior to processing by the schema generator to facilitate defining indexes. Additionally, the model may be automatically annotated to a degree. For example date and time values may be marked as dimensions, process identifiers may be sortable and the like.

In block 218, dimensional tables may be defined using the temporary dimension collections previously formed. In block 220, any foreign key columns, similar to those previously described, may be added to the fact table as pointers to related rows in the dimension tables.

In block 222, any foreign key relationships between the fact table and dimension tables may be defined similar to that previously described. The method 200 may then return to block 204 where the method may proceed as previously described until it has iterated through all monitor contexts associated with the observation model.

Figure 3A:
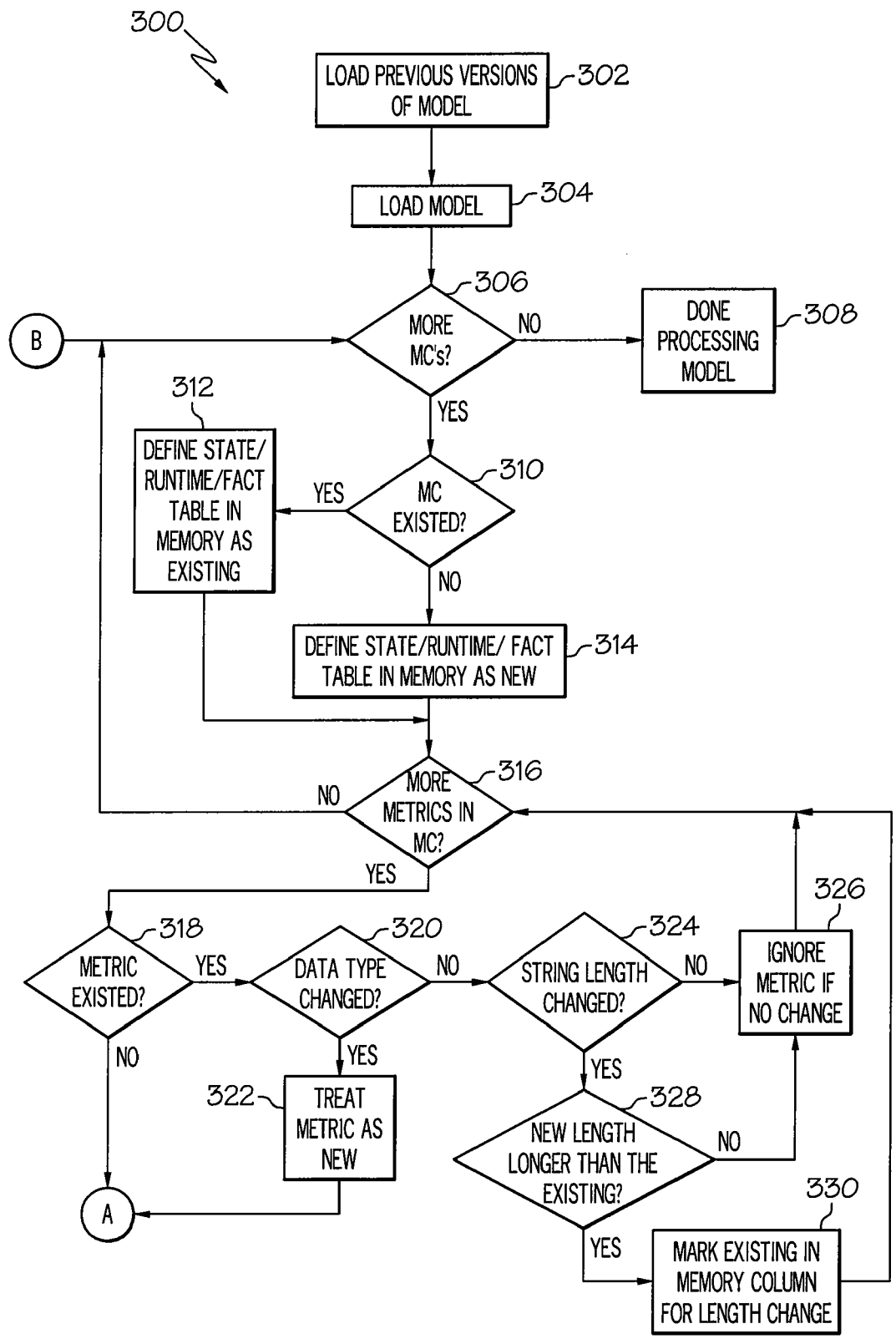
FIGS. 3A, 3B and 3C (collectively FIG. 3) are a flow chart of an exemplary method for managing changes in an observation model in accordance with an embodiment of the present invention.
Figure 3B:
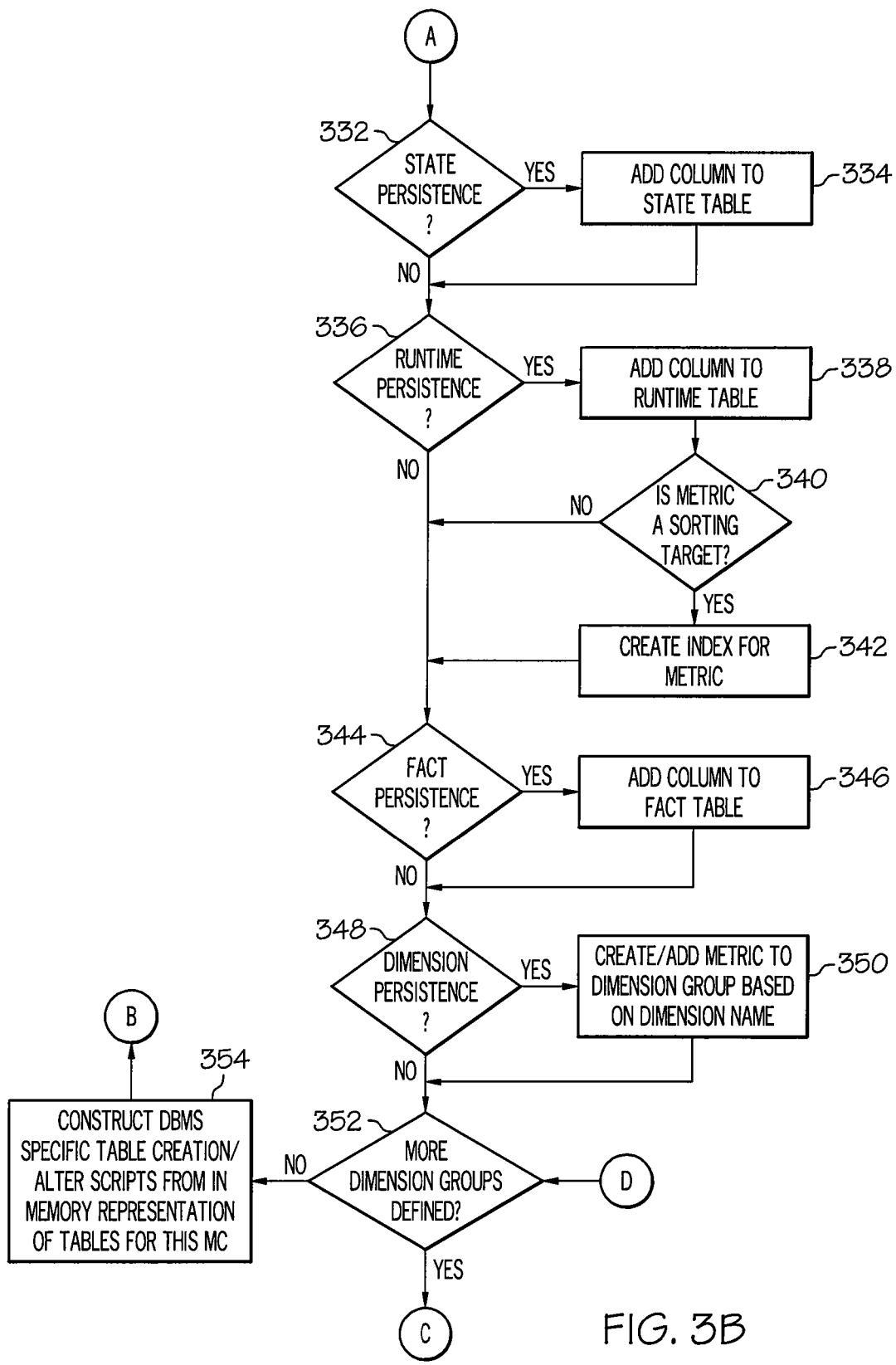
Figure 3C:
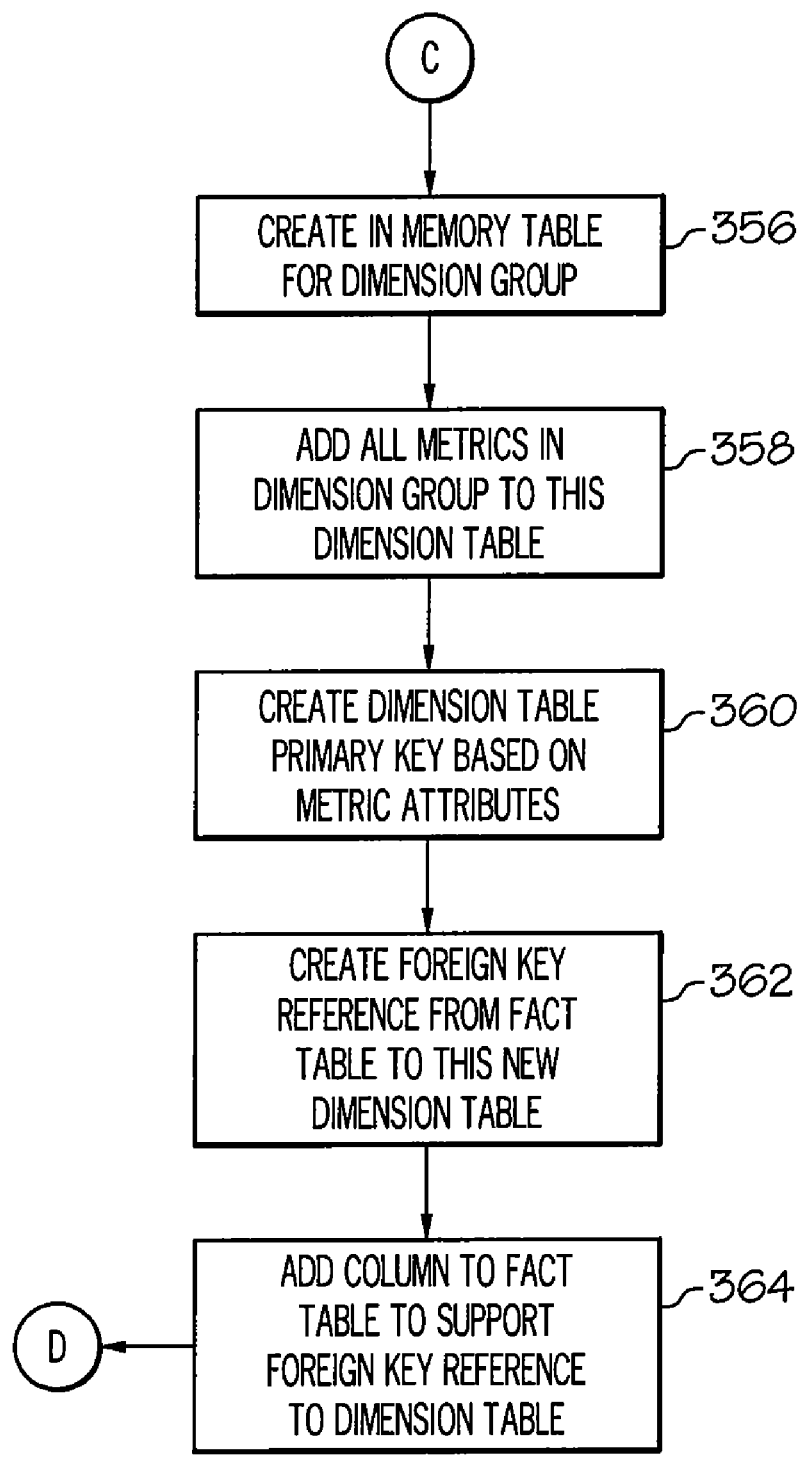

FIGS. 3A, 3B and 3C (collectively FIG. 3) are a flow chart of an exemplary method 300 for managing changes in an observation model in accordance with an embodiment of the present invention. In block or module 302, a previous version or versions of the observation model may be loaded. Loading the previous versions of a model may consist of doing essentially all the same steps as loading a current or new version. Loading previous versions creates an in memory representation of the current state of the relational tables. If there are no previous versions, all tables will be new. The in memory tables may be modified as the new model is processed, tracking the necessary changes so that the changes can be applied to the real relational tables at the end.

In block or module 304, a revised and redeployed observation model may be loaded. The method 300 may then iterate through all the monitor contexts and metrics in each context as further described.

In block 306, a determination may be made if there are more monitor contexts (MCs) in the model. If there are no more monitor contexts, the method 300 may advance to block 308 and the method is done processing the redeployed model. If there are more monitor contexts, a next monitor context is selected for evaluation and the method may advance to block 310.

In block 310, a determination may be made if the current monitor context existed in a previous version or versions of the observation model. If the current monitor context previously existed, the method 300 may advance to block 312. In block 312, a state/runtime/fact table may be defined in memory as existing. The method 300 may then advance to block 316.

If the current monitoring context in block 310 does not exist in a previous version of the observation model, the method 300 may advance to block 314. In block 314, a state/runtime/fact table may be defined in memory as new. The method 300 may then advance from block 314 to block 316.

In block 316, the method 300 may begin iterating through all metrics in the current monitoring context. In block 316, a determination may be made if there are more metrics in the current monitoring context. If there are no more metrics in the current monitoring context, the method 300 may return to block 306 to continue iterating through the monitoring contexts. Otherwise, another metric is selected and the method 300 may advance to block 318. In block 318, a determination may be made if the metric previously existed. If the metric did not previously exist or is new, the method 300 may advance to block 332. If the metric previously existed, the method 300 may advance to block 320. In block 320, a determination may be made if the data type associated with the metric changed. If the data type did change in block 320, the method 300 may advance to block 322. In block 322, the metric may be treated as a new metric and the method 300 may proceed to block 332.

If a determination is made in block 320 that the data type of the metric did not change, the method 300 may advance to block 324. In block 324, a determination may be made if the string length of the metric changed. If the string length did not change, the method may proceed to block 326. If the string length did change, the method 300 may advance to block 328. In block 328, a determination may be made if the new string length is longer than the string length of the exiting or previous metric. If the string length did not change, the method 300 may advance to block 326. In block 326, the metric may be ignored if there is no change in the string length. The method 300 may then return to block 316 to continue iterating through all the metrics for the current monitor context.

If a determination is made in block 328 that the string length is longer than the string length of the exiting metric, the method 300 may advance to block 330. In block 330, the string length may be marked existing in a memory column corresponding to the metric. The method 300 may then return to block 316 to continue iterating through any remaining metrics for the current monitor context.

In block 332, state persistence may be determined relative to the current metric. If the state of the metric is persistent and not temporary, a column for the metric may be added to a state table in block 334. If the state of the metric is temporary and not persistent, the method 300 may advance to block 336. In block 336, a determination may be made if the current metric is runtime persistent. If not, the method 300 may advance to block 344. If the current metric is determined to be runtime persistent, a column for recording values of the metric may be added to a runtime table in block 338.

In block 340, a determination may be made whether the current metric is a sorting target or may be used for other purposes. If the metric is not a sorting target in block 340, the method 300 may advance to block 344. If the metric is a sorting target, an index for the metric may be created in block 342. The method 300 may then advance to block 344.

In block 344, a determination may be made if the current metric is fact persistent. If not, the method 300 may advance to block 348. If the metric is fact persistent, a column may be added to a fact table for recording values of the metric in block 346. The method 300 may then advance to block 348.

In block 348, a determination may be made whether the current metric is dimension persistent. If not, the method may advance to block 352. If the metric is dimension persistent, a metric dimension group may be created in block 350 or the metric may be added to an already created dimension group based on the dimension name or type before proceeding to block 352. Metrics can belong to zero or one dimension group. A dimension group is a concept such as "geography" which might consist of "city", "state", and "zip code" metrics. Accordingly, to process metrics that are in a dimension, a dimension grouping may be created for all metrics in the same dimension group. These dimension groups may be processed later to create/update the dimension table that supports each dimension group.

In block 352, a determination may be made if more dimension groups need to be defined. If the determination is block 352 is that no more dimension groups need to be defined, the method may advance to block 354. In block 354, DBMS specific table creation or alter scripts may be constructed from in-memory representation of the tables for the current monitoring context. Constructing the DBMS specific table creation or alter script may include looking through the tables that have been defined in memory, or tagged as being altered in memory, and intelligently writing Structured Query Language (SQL) statements or the like which will alter or create the tables. The SQL statements are targeted based on the particular DBMS type. The method 300 may then return to block 306 to continue to iterate through all of the monitoring contexts.

If the determination in block 352 is that more dimension groups need to be defined, the method 300 may advance to block 356. In block 356, an in memory table may be created for a new dimension group. In block 358, all metrics in this dimension group may be added to the corresponding dimension table.

In block 360, a dimension table primary key may be created based on the metric attributes. Metrics which belong to a dimension group may have additional information provided in the model which indicates whether this metric forms part of the key for the dimension. For example, if a geography dimension also includes a "temperature" metric, the key for the dimension might be city/state/zip, while temperature is just additional information that doesn't uniquely identify a particular geography. Accordingly, the temperature metric would not be marked as part of the key in the dimension.

In block 362, a foreign key reference may be created from the fact table to the new dimension table created in block 360. In block 364, a column may be added to the fact table to support foreign key reference to the dimension table. The method 300 may then return to block 352 to determine if there are more dimension groups defined. The method 300 may then proceed as previously described until the method has iterated through all monitoring contexts in block 306.

The present invention may represent metrics differently depending on the database target (state, runtime, datamart). For example, Time information may be recorded as an integer "milliseconds since Jan 1, 1970" in the state database, but recorded as a pure SQL Time object in the runtime database. This may be beneficial because the integer value may be preferred for the type of access patterns used against the state database by some servers, while the more display-friendly Time datatype is better for some reporting/display processes which show the user their recorded data. Accordingly, the method or generator of the present invention can optimize relational tables depending on the expected usage by allowing multiple tables tuned to various usages to be produced. Metrics can be represented in different ways depending on the target database.

Figure 4:
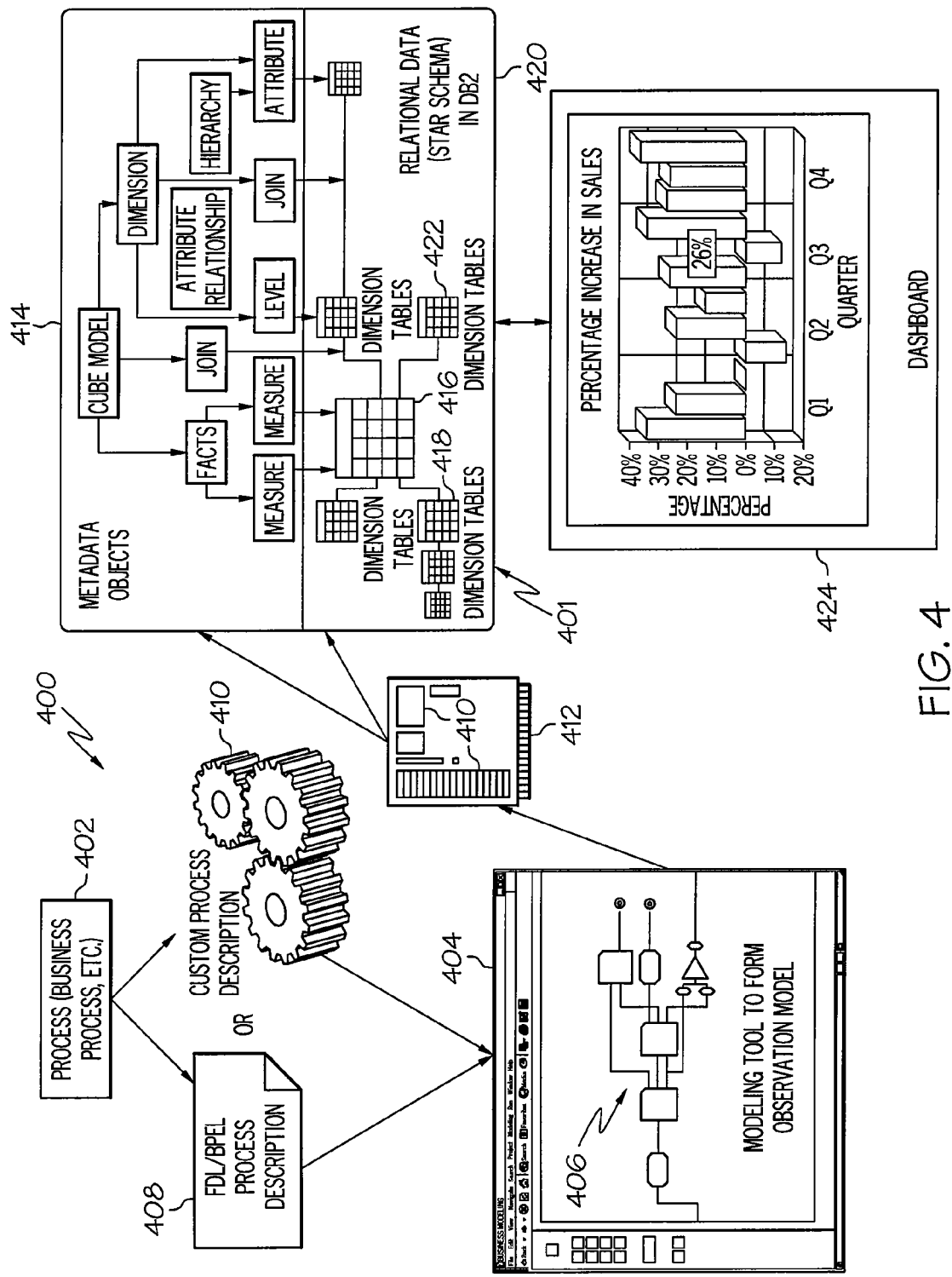
FIG. 4 is a diagram of an example of a system for dynamically, optimally generating and modifying a datastore in accordance with an embodiment of the present invention.

FIG. 4 is a diagram of an example of a system 400 for dynamically, optimally generating and modifying a datastore 401 in accordance with an embodiment of the present invention. A process 402, such as a business process or other process may be modeled by a modeling tool 404 to form an observation model 406 or the like. The modeling tool 404 may involve forming a FDL/BPEL process description 408 or a custom process description 410. The observation model 406 may be a digital or electronic representation or description of the process that can be inputted into a schema generator 412 and used by the schema generator 412 to generate and/or modify the datastore 401 or data schema. The methods 100, 200 and 300 of FIGS. 1, 2, and 3, respectively, may be embodied in the schema generator 408. Accordingly, the schema generator may include modules 410, components or data structures 410 to perform functions or operations similar to the blocks or modules in methods 100-300. Accordingly, the schema generator 408 may form metadata objects 414 to manipulate and manage fact tables 416 and related dimensional tables 418 in a relational database 420 or the like. The tables 416 and 418 may form a star schema or other type arrangement.

As previously discussed, the metrics 422 may be indexed and the dynamic, optimized structure formed by the schema generator 412 facilitates extraction of data from the datastore 401 to present the data or information to a user in the form of a dashboard 424 or similar means of presentation, for example on a monitor of a computer system or the like.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for generating and modifying a datastore performed by a schema generator, comprising:
   identifying, by the schema generator, all processes associated with an observation model;
   identifying, by the schema generator, a metric associated with each process to be recorded and with each monitoring context;
   automatically, constructing by the schema generator, a database schema that stores the metric data and provides appropriate interrelations between the processes, the automatically constructing the database schema comprising:
      generating, by the schema generator, a table for each process in the observation model;
      providing, by the schema generator, columns in the table such that a column exists for each process to store each metric associated with a particular process; and
      modifying the database schema in response to any new metrics being added to the observation model; and
   creating, by the schema generator, indexes for the table that optimizes performance based on flags on the metrics, the indexes optimizing at least one of storing, sorting and retrieving process information.

2. A system for generating and modifying a datastore, comprising:
   a CPU processor; and
   a schema generator, which operates on the CPU processor, configured to automatically construct a database schema that stores metric data and provides appropriate interrelations between processes of an observation model, the schema generator further being configured to execute:
      a module to generate a table corresponding to each process in the observation model;
      a module to provide columns in the table such that a column exists for each process to store each metric associated with a particular process;

a module to modify the database schema in response to any new metrics being added to the observation model; and a module to create indexes for the table that optimizes performance based on flags on the metrics, the indexes optimizing at least one of storing, sorting and retrieving process information.

3. A computer program product to generate and modify a datastore, the computer program product comprising computer usable program code embodied in a computer usable storage medium, the computer program product comprising:

computer usable program code configured to generate a table for each process in an observation model;

computer usable program code configured to provide a column in each table corresponding to each metric associated with the process intended to be recorded;

computer usable program code configured to modify each table in response to any new metrics being added to the observation model; and computer usable program code configured to create indexes for the table that optimizes performance based on flags on the metrics, the indexes optimize optimizing at least one of storing, sorting and retrieving process information.

4. The method according to claim 1, further comprising generating by the schema generator, a process model description.

5. The method according to claim 1, further comprising identifying by the schema generator, all monitoring contexts associated with the observation model.

6. The method according to claim 1, further comprising mapping by the schema generator, each different process datatype to a corresponding database management system datatype.

7. The method according to claim 1, further comprising identifying by the schema generator, any primary key fields for each process.

8. The method according to claim 1, further comprising identifying by the schema generator, each table and column by a globally unique name to allow state, runtime and datamart tables for a particular process to reside on a common database.

9. The method according to claim 1, further comprising creating by the schema generator, any foreign key constraints to link between any related processes.

10. The method according to claim 1, further comprising automatically detecting by the schema generator, any changes in a redeployed observation model.

11. The method according to claim 1, further comprising modifying by the schema generator, the database schema in response to any changes in the redeployed observation model.

12. The system according to claim 2, the schema generator further being configured to execute a component to add an appropriate column to a fact table based on a datatype for each metric corresponding to a fact.

13. The system according to claim 2, the schema generator further being configured to execute a component to form a dimension table to record each metric related to a select dimension.

14. The system according to claim 2, the schema generator further being configured to execute a foreign key module to define any foreign key relationships between the fact table and the dimension table.

15. The system according to claim 2, the schema generator further being configured to execute an update module to modify the database schema in response to any revisions in a redeployed observation model.

16. The computer program product according to claim 3, computer usable program code configured to add an appropriate column to a fact table based on a datatype for each metric corresponding to a fact.

17. The computer program product according to claim 3, computer usable program code configured to form a dimension table to record each metric related to a select dimension.

18. The computer program product according to claim 3, computer usable program code configured to modify the database schema in response to any revisions in a redeployed observation model.

* * * * *